P. G. HOWE & A. R. LAMBERT.
MOTOR VEHICLE FIRE ENGINE.
APPLICATION FILED NOV. 2, 1916.

1,272,956.

Patented July 16, 1918.
3 SHEETS—SHEET 3.

UNITED STATES PATENT OFFICE.

PERLEY G. HOWE AND ALVAN RAY LAMBERT, OF ANDERSON, INDIANA.

MOTOR-VEHICLE FIRE-ENGINE.

1,272,956.     Specification of Letters Patent.     Patented July 16, 1918.

Application filed November 2, 1916. Serial No. 129,177.

*To all whom it may concern:*

Be it known that we, PERLEY G. HOWE and ALVAN RAY LAMBERT, citizens of the United States of America, and residents of Anderson, county of Madison, State of Indiana, have invented certain new and useful Improvements in Motor-Vehicle Fire-Engines, of which the following is a full and clear specification.

The object of this invention is to provide a simple fire-engine apparatus which is adapted to be attached to an automobile, preferably the machine known as the "Ford," whereby the usual power plant on the vehicle may be used not only to drive the vehicle to the place of use, but also to drive the pumping plant carried by the vehicle when it arrives at the fire, the pumping apparatus being preferably arranged to deliver either a plain stream of water or a chemical stream, as more fully hereinafter set forth.

In the drawing—

Figs. 4 and 5 are detail views hereinafter described.

Figure 1:
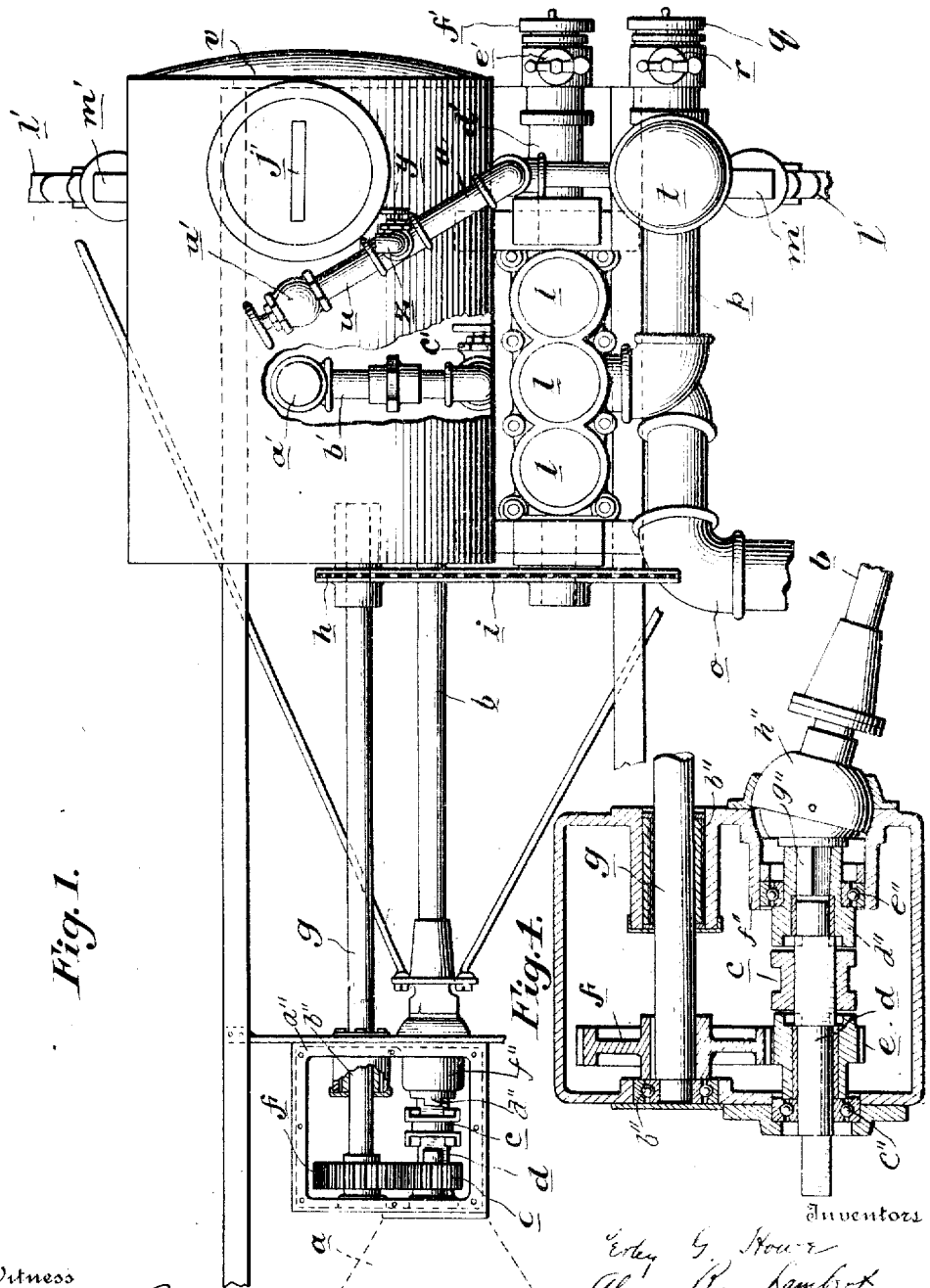
Figure 1 is a plan view of a "Ford" chassis provided with my improved mechanism.
Figure 2:
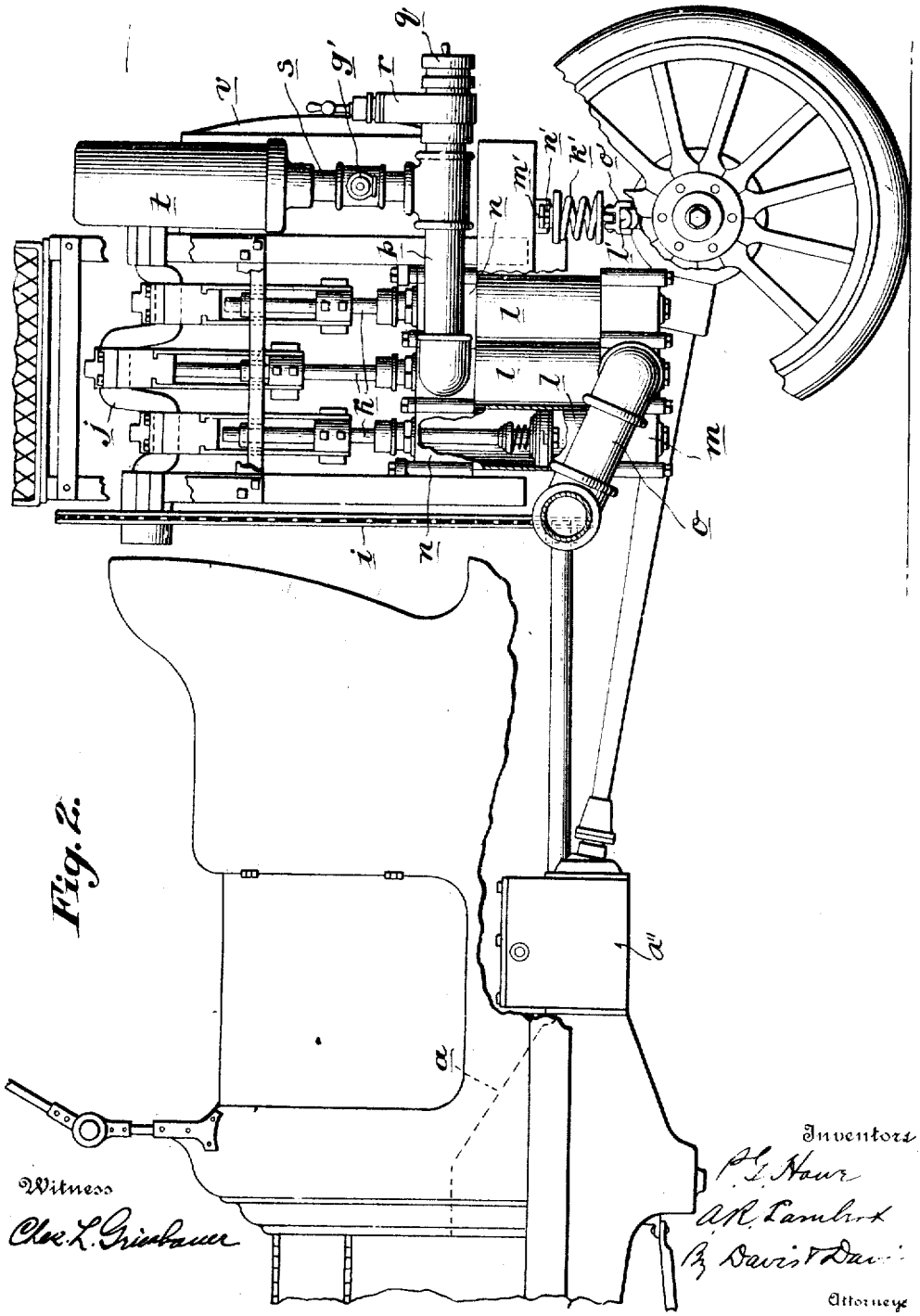
Fig. 2 is a side elevation of the same partly in section.

Referring to the drawing by reference characters, $a$ designates the usual transmission of the vehicle, $b$ the usual propeller shaft for driving the vehicle through the rear axle, $c$ a dental or double clutch slidably mounted on a squared part of shaft $d$ and adapted to be rotated therewith. On the shaft $d$ is mounted a freely rotatable pinion $e$ which meshes with a gear $f$ mounted on a shaft $g$ whose rear end carries a sprocket $h$ which runs a chain $i$ for driving the pump. A box $a''$, arranged at the rear end of the transmission $a$, houses the clutch members and the gears $e$ and $f$ and permits effective lubrication of said parts. The shaft $g$ is journaled in bearings $b''$ in the walls of the box, and the transmission-driven shaft $d$ is journaled at its forward end in the bearing $c''$ in the front wall of the box and at its rear end in an axial passage formed in a clutch member $d''$ which is journaled in a bearing $e''$ supported in an annular inwardly-extending flange $f''$ carried by the rear wall of the box. The clutch member $d''$ is made rotatable with the vehicle-driving shaft $b$ by being fitted over the squared end $g''$ thereof, this squared end being connected to the usual universal joint $h''$ mounted upon the rear wall of the box. This arrangement of parts makes a very compact and simple mechanism, and the rear wall of the box is utilized as a support for the universal joint. This arrangement of parts adapts our gearing to be readily applied to the well known Ford type of automobile.

By shifting the clutch $c$ rearwardly, the usual propeller shaft of the vehicle will be driven in the usual way, the shaft $g$ being idle by reason of the loose mounting of the pinion $e$ on the driving shaft $d$ of the transmission. By throwing the clutch $c$ forwardly into engagement with the pinion $e$, said pinion is thereby locked to the driving shaft $d$ and the propeller shaft $b$ of the vehicle driving mechanism is released, and the pump mechanism will then be operated through the medium of the gears $e$, $f$, shaft $g$ and chain $i$. It will be understood that the transmission gearing $a$ is of the usual type, so that whether the clutch $c$ be in engagement with the pinion $e$ for driving the pump or be in engagement with the propeller shaft, the usual change in speed can be accomplished without manipulating the clutch $c$. It will be observed that the clutch $c$ is at all times in engagement with the propeller shaft of the vehicle except when the vehicle is at rest and the pumping apparatus is being driven from the power plant of the vehicle. In other words, it will be understood that the clutch $c$ is not manipulated at all in the control of the vehicle.

The chain $i$ drives the pump crank shaft $j$ which is adapted to operate three pump plungers $k$ whose pistons work in three pump cylinders $l$, these pump cylinders being provided with a common inlet manifold $m$ and a common outlet manifold $n$, the inlet chamber $m$ being provided with an inlet pipe $o$ adapted to be connected by hose to the source of water supply.

The outlet chamber $n$ is provided with an outlet pipe $p$, to the end $q$ of which a hose may be connected, the pipe being provided with a valve $r$. Back of the valve rises a branch pipe $s$ whose upper end is connected to the air chamber $t$; and from the pipe $s$ extends a by-pass pipe $u$ to the top side of a chemical tank $v$. This pipe $u$ is provided with a globe valve $u'$ and extends down vertically to a point near the bottom of the chemical tank and is there provided with a nozzle $w$ pointing downwardly. A branch pipe $x$ extends upwardly from the by-pass pipe $u$ and is provided with a valve $y$, the extremity $z$ of this latter pipe being adapted to receive the inlet end of a hose of small diameter.

In the bottom of the tank is arranged an outlet strainer $a'$ which communicates with an outlet pipe $b'$ provided with a manually operable valve $c'$ and having its exit connected with the inlet chamber $m$ of the pump.

It will be understood that a line of suction hose is to be attached to the inlet pipe $o$ and extended to the source of supply. Water passes into the inlet chamber $m$, thence through the piston valves and into the chamber $n$, whence it may pass out through any one or more of the outlet pipes $p$, $z$, and $d'$, suitable lines of hose being, of course, connected to whichever ones are used and the others being closed in any suitable manner. The air chamber $t$ insures an even flow of water whichever nozzle is in use. To prevent the pump bursting against undue pressure, a suitable relief valve $g'$ is provided in the pipe connecting this chamber with the outlet pipe $p$.

Figure 3:
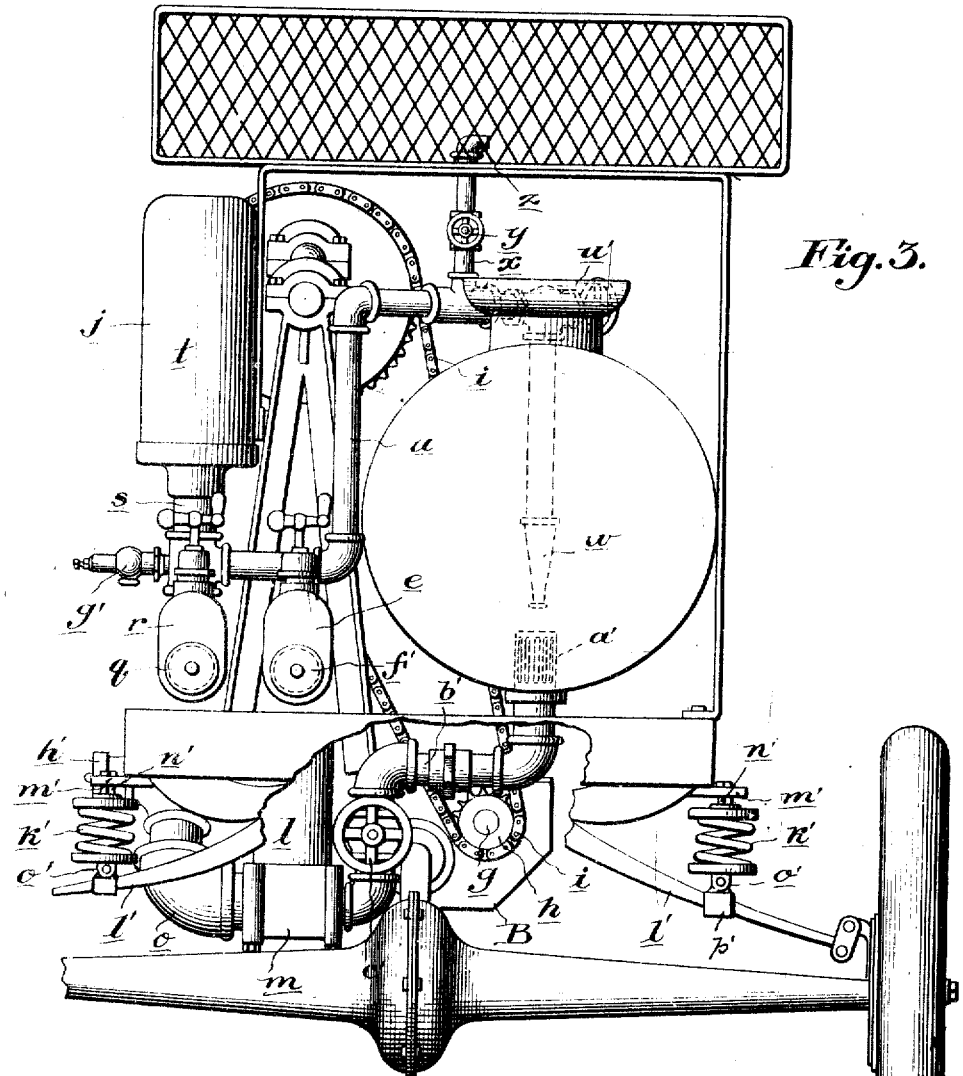
Fig. 3 is a rear elevation partly broken away.

In case there is not a sufficient supply of water in the source available, the chemical apparatus is brought into play, it being understood that the tank $v$ is at all times kept filled with water and the usual chemical substance. When this chemical apparatus is brought into action, the inlet pipe $o$ is closed by a suitable cap (shown at $h'$ in Fig. 3) and then valve $c'$ is opened and the pump is operated under low speed, the usual low speed of the "Ford" transmission being right. When the pump is thus revolved slowly, the mingled chemical materials and water from the tank $v$ are caused to pass through the pump and up through the pipe line $u$ and out through the small hose that is always kept connected to the outlet nozzle $z$, a suitable basket being provided for holding this hose in a coiled or folded condition. When this chemical hose is employed, it will be understood that the other outlets are closed. The pump being much larger than is required to supply the small chemical stream, surplus water from the pump, when valve $u'$ is open, passes back into the chemical tank through the nozzle $w$, thus constantly and thoroughly agitating the chemicals in the tank and eliminating the necessity of employing a mechanical stirrer for that purpose. Thus constantly keeping the chemicals stirred in the tank insures maximum effectiveness in the chemical stream.

It will be observed that a special advantage in connecting up a chemical apparatus in the manner set forth to a direct plain water pumping apparatus lies in the fact that the chemical apparatus is in condition for instant use when the motor vehicle arrives at the fire. It of course requires some little time to connect the source of supply to the inlet pipe by means of the suction hose after arrival at the fire, and during this very vital interval the chemical apparatus may be brought into use. The importance of this will be understood when it is remembered that in many parts of the country prompt arrival of the fire apparatus means that fires can be put out by the chemical apparatus alone.

The letter $j'$ designates a large filling opening at the top of the tank $v$. If no other water supply is available, the fireman can replenish the water in the tank by pouring pails of water through this opening, of course replenishing the chemicals from time to time, the chemicals being automatically agitated by the surplus water passing into the tank through the nozzle $w$. It will therefore be observed that my apparatus may be continuously used as a chemical extinguisher alone where there is not a sufficient water supply available to use plain water.

Figure 5:
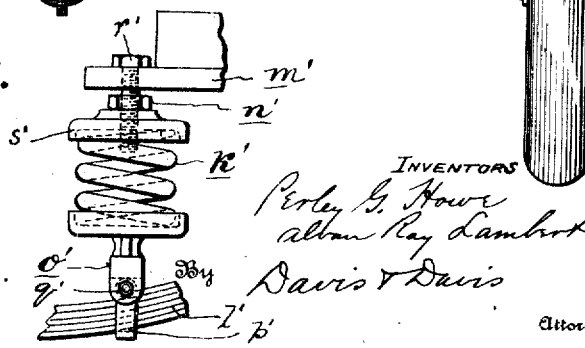

It will be observed that the preponderance of weight of the apparatus is located on the left-hand side of the vehicle. In order to equalize this preponderance of weight so that the car will at all times carry level, two auxiliary supporting springs $k'$ are employed at the rear of the vehicle. These springs are supported on the usual leaf spring $l'$ and their upper ends are arranged to engage under a bar $m'$ carried by the vehicle frame. Suitable nuts $n'$ are employed for varying the tension of the springs. By increasing the tension on the spring at the left-hand side of the vehicle, the preponderance of weight at that side will be neutralized and the vehicle frame will be maintained in a level position. The lower supporting member $o'$ of each spring is adapted to be adjusted along the leaf spring $l'$ to enable the springs to be properly adjusted under the bar $m'$ before they are tensioned properly. A desirable way of anchoring the lower member $o'$ to the spring $l'$ is to pivot the same to a clip $p'$ which is in turn anchored to the spring by having its pivot bolt $q'$ pass through the curled-up end of the top leaf of the spring, as shown in Fig. 5. The tensioning nut $n'$ is threaded onto bolt $r'$ which is threaded down through the bar $m'$ and passes through a hole in the center of the upper spring-receiving cup $s'$, said nut $n'$ bearing down on top of this cap.

It will be observed that an advantage in so compactly constructing the gearing for driving the vehicle and pump that it may be inclosed in a comparatively small box arranged close up to the usual transmission-casing $a$ and mounting the universal joint of the vehicle-propelling-shaft upon the rear wall of the box is that we avoid increasing the angle of the propeller-shaft to any material extent, so that, when the mechanism is adjusted to drive the vehicle, we obtain practically the same efficiency as is obtained when the universal joint is mounted on the rear end of the transmission-casing.

It will be observed that the short shaft $g$ is driven from the main driven-shaft of the transmission, and, since both the pump and the vehicle are driven from this shaft $d$, it will be seen that the variable-speed mechanism of the usual transmission is utilized for variably driving either the pump or the vehicle.

Having thus described our invention, what we claim is:

1. In a fire extinguishing apparatus, the combination of a pump having a main inlet and a main outlet and means for closing each, a chemical attachment therefor embodying a tank having a filling opening, a pipe connecting the outlet of this tank to the inlet side of the pump and provided with a manually-controlled valve, a by-pass pipe of smaller diameter than the main outlet and inlet connecting the inlet of the tank to the outlet side of the pump, this by-pass pipe being provided with a manually-controlled valve and also with an outlet for the chemical stream which is connected to the by-pass pipe at a point between said valve and the pump, this chemical outlet pipe being provided with a manually-controlled valve, for the purposes set forth.

2. The combination with a motor vehicle embodying a change-speed transmission and a vehicle-driving shaft, of a pumping-apparatus mounted on the vehicle, and means whereby the vehicle shaft or the pumping-apparatus may be alternately and independently driven from said transmission, said means embodying a box or casing arranged adjacent the transmission, a supplemental shaft journaled in said box and geared to the pumping-apparatus, a universal-joint mounted in the rear wall of said box and having connected to its forward end a clutch-member located within the box and journaled on the rear wall thereof, the forward end of this clutch-member being provided with an axial passage for the reception of the rear end of the driven shaft of said transmission, said driven shaft of the transmission passing through the front wall of said box, gearing for driving said supplemental shaft from said transmission-driven shaft including a gear mounted rotatably on said transmission-driven shaft and provided with a clutch-member which faces the aforesaid clutch-member connected to the universal joint, and a double clutch-member slidably mounted on the transmission-driven shaft and adapted to be engaged with either one of the aforesaid clutch-members.

3. The combination with a motor vehicle embodying a change speed transmission and a vehicle driving shaft, of a pumping apparatus mounted on the vehicle and means whereby the pumping apparatus or the vehicle driving shaft may be alternately and independently driven from said transmission, said means embodying a box or casing arranged adjacent to the transmission, a pumping shaft journaled in the casing, a transmission-driven shaft extending into the casing and provided with a slidable non-rotatable double clutch member, gearing for driving the pump-driving shaft adapted to be engaged by one face of said double clutch member, another clutch member for driving the vehicle driving shaft connected non-rotatably thereto and located within the casing, the vehicle driving shaft including a universal joint supported on the rear wall of the casing.

4. The combination with a motor vehicle embodying a change-gear transmission and a vehicle-driving-shaft and a pumping apparatus mounted on the vehicle, of means for variably driving either the pumping apparatus or the vehicle alternately from the main driven-shaft of said transmission, said means embodying a casing set up close to the rear end of the transmission, a universal joint connected to the propeller-shaft and mounted in the rear of the wall of said casing, a transmission-driven shaft extending through the front wall of the casing and connected to the transmission, a pump-driving shaft $g$ journaled in the casing, and mechanism within the casing whereby the power of the transmission-driven shaft may be transmitted either to said pump-driving shaft or to the propeller-shaft of the vehicle through the universal joint.

In testimony whereof we hereunto affix our signatures.

PERLEY G. HOWE.
ALVAN RAY LAMBERT.